(12) United States Patent
Du et al.

(10) Patent No.: US 10,050,850 B2
(45) Date of Patent: *Aug. 14, 2018

(54) RACK AWARENESS DATA STORAGE IN A CLUSTER OF HOST COMPUTING DEVICES

(71) Applicant: VMware, Inc., Palo Alto, CA (US)

(72) Inventors: Junping Du, Beijing (CN); Ying He, Palo Alto, CA (US); Da Wan, Beijing (CN); Jun Xiao, Beijing (CN)

(73) Assignee: VMWARE, INC., Palo Alto, CA (US)

( * ) Notice: Subject to any disclaimer, the term of this patent is extended or adjusted under 35 U.S.C. 154(b) by 170 days.

This patent is subject to a terminal disclaimer.

(21) Appl. No.: 14/996,081

(22) Filed: Jan. 14, 2016

(65) Prior Publication Data

US 2016/0127206 A1 May 5, 2016

Related U.S. Application Data

(63) Continuation of application No. 13/407,895, filed on Feb. 29, 2012, now Pat. No. 9,268,590.

(51) Int. Cl.
| | |
|---|---|
| *G06F 9/46* | (2006.01) |
| *H04L 12/26* | (2006.01) |
| *G06F 9/50* | (2006.01) |
| *G06F 9/455* | (2018.01) |
| *H04L 29/08* | (2006.01) |

(52) U.S. Cl.
CPC .......... *H04L 43/04* (2013.01); *G06F 9/45558* (2013.01); *G06F 9/5077* (2013.01); *H04L 67/18* (2013.01)

(58) Field of Classification Search
None
See application file for complete search history.

(56) References Cited

U.S. PATENT DOCUMENTS

| | | |
|---|---|---|
| 7,802,000 B1 | 9/2010 | Huang et al. |
| 8,260,840 B1 | 9/2012 | Sirota et al. |
| 8,296,267 B2 | 10/2012 | Cahill et al. |
| 8,307,187 B2 | 11/2012 | Chawla et al. |

(Continued)

OTHER PUBLICATIONS

"Amazon Elastic MapReduce Developer Guide, API Version 2009-03-31", pp. 100-274, Amazon Web Services LLC.

*Primary Examiner* — Wissam Rashid (57) ABSTRACT

A method receives physical location information for racks in which application running environments are located. Each rack includes multiple host computing devices in a cluster of host computing devices. Application running environment-rack associations are generated using the physical location information for the cluster where an application running environment-rack association maps an application running environment to a rack. The application running environment-rack associations are provided to the cluster. Then, the method provides a data set for storing in the cluster of hosts where the data set is associated with a placement strategy. The cluster uses the placement strategy to store a data block in the data set for a first application running environment and store a replica data block for a second application running environment at a location in the cluster based on the first application running environment being associated with a first rack from the application running environment-rack associations.

21 Claims, 6 Drawing Sheets

(56) References Cited

U.S. PATENT DOCUMENTS

| | | | |
|---|---|---|---|
| 2009/0328073 A1 | 12/2009 | Tripathi | |
| 2012/0005344 A1* | 1/2012 | Kolin | H05K 7/20836 709/226 |
| 2012/0136829 A1* | 5/2012 | Darcy | G06F 17/30575 707/626 |
| 2013/0159637 A1* | 6/2013 | Forgette | G06F 3/0605 711/154 |
| 2013/0227558 A1 | 8/2013 | Du et al. | |

* cited by examiner

RACK AWARENESS DATA STORAGE IN A CLUSTER OF HOST COMPUTING DEVICES

CROSS REFERENCE TO RELATED APPLICATIONS

The present disclosure is a continuation of U.S. application Ser. No. 13/407,895, entitled "Provisioning of Distributed Computing Clusters", filed Feb. 29, 2012, the contents of which is incorporated herein by reference in its entirety.

BACKGROUND

Distributed computing platforms, such as HADOOP™, include software that allocates computing tasks across a group, or "cluster," of distributed software components executed by a plurality of computing devices, enabling large data sets to be processed more quickly than is generally feasible with a single software instance or a single device. Such platforms typically utilize a distributed file system that can support input/output (I/O) intensive distributed software components running on a large quantity (e.g., thousands) of computing devices to access a large quantity (e.g., petabytes) of data. For example, the HADOOP Distributed File System (HDFS) is typically used in conjunction with HADOOP—a data set to be analyzed by HADOOP may be stored as a large file (e.g., petabytes) on HDFS which enables various computing devices running HADOOP software to simultaneously process different portions of the file.

Typically, distributed computing platforms such as HADOOP are configured and provisioned in a "native" environment, where each "node" of the cluster corresponds to a physical computing device. In such native environments, administrators typically need to manually configure the settings for the distributed computing platform by generating or editing configuration or metadata files that, for example, specify the names and network addresses of the nodes in the cluster as well as whether any such nodes perform specific functions for the distributed computing platform (e.g., such as the "JobTracker" or "NameNode" nodes in HADOOP). More recently, service providers that offer "cloud" based "Infrastructure-as-a-Service" (IaaS) offerings have begun to provide customers with HADOOP frameworks as a "Platform-as-a-Service" (PaaS). For example, the Amazon Elastic MapReduce web service, which runs on top of the Amazon Elastic Compute Cloud (Amazon EC2™) IaaS service, provides customers with a user interface to (i) provide data for processing and code specifying how the data should be processed (e.g., "Mapper" and "Reducer" code in HADOOP), and (ii) specify a number of nodes in a HADOOP cluster used to process the data. Such information is then utilized by the Amazon Elastic MapReduce web service to start a HADOOP cluster running on Amazon EC2 to process the data.

Such PaaS based HADOOP frameworks however are limited, for example, in their configuration flexibility, reliability and robustness, scalability, quality of service (QoS) and security. For example, such frameworks may not address single point of failure (SPoF) issues in the underlying distributed computing platform, such as the SPoF represented by the NameNode in HADOOP. As another example, such frameworks are not known to provide user-selectable templates, such that a preconfigured application environment with a known operating system and support software (e.g., a runtime environment) can be quickly selected and provisioned.

SUMMARY

A method receives physical location information for a plurality of racks in which application running environments are located. Each rack includes multiple host computing devices in a cluster of host computing devices. Application running environment-rack associations are generated using the physical location information for the cluster of host computing devices where an application running environment-rack association maps an application running environment to a rack. The application running environment-rack associations are provided to the cluster of host computing devices. Then, the method provides a data set for storing in the cluster of host computing devices where the data set is associated with a placement strategy. The cluster uses the placement strategy to store a data block in the data set for a first application running environment and store a replica data block for a second application running environment at a location in the cluster of host computing devices based on the first application running environment being associated with a first rack from the application running environment-rack associations.

This summary introduces a selection of concepts that are described in more detail below. This summary is not intended to identify essential features, nor to limit in any way the scope of the claimed subject matter.

DETAILED DESCRIPTION

Embodiments described herein provide a distributed computing platform (e.g., HADOOP, etc.) service that, for example, runs within an IaaS environment managed by a service provider or within an enterprise's own internal data center environment. Certain of such embodiments provide a user interface for users to provide cluster size, data sets, data processing code (also referred to herein as "jobs") and other preferences and configuration information to the distributed computing platform service in order to process or otherwise analyze the provided data sets within the environment. The distributed computing platform service is then able to provision and deploy a properly configured distributed computing cluster in which nodes of the cluster are implemented as virtual machines (VMs) running on a number of "host" computing devices (e.g., hardware servers, etc.) in the environment (e.g., in the IaaS or data center). In exemplary embodiments, the distributed computing platform service includes a "cluster management application" that receives the foregoing user specified inputs (e.g., cluster size, data sets, jobs, etc.) and interacts with a "virtualization management application" to select appropriate VM templates that include distributed software components that conform to the conventions of the distributed computing platform and then select appropriate host computing devices within the environment to launch VMs based on such templates. Accordingly, such embodiments enable a reduction in manual provisioning and configuration effort and also reduce the risk of error and satisfy the operator's requirements, such as scalability, response latency, and speed of provisioning. In addition, as further discussed below, certain embodiments may apply virtualization technologies, such as linked cloning, thin provisioning, multi-level resource isolation, resource pooling, and fault tolerance, enabling efficient creation of the cluster and robust, efficient, and secure operation of the cluster, once established.

Exemplary embodiments may operate using management application programming interfaces (APIs) to control and query cloud resources, hypervisors, and/or virtual machines (VMs). Virtualization technologies such as thin provisioning and linked cloning may be employed to reduce input/output (I/O) traffic associated with provisioning, similarly reducing the time used to complete provisioning operations.

To facilitate robust and efficient execution in a cloud environment, embodiments described provide network topology information, enabling proper operation of the distributed computing platform's data replication functions despite the fact that some infrastructure information may be concealed from the operator of the cluster. Further, distributed computing nodes (e.g., executed by VMs) may be placed on hosts according to a user-selectable placement strategy to achieve a desired balance between robustness and efficiency.

Multi-level resource isolation may be applied to prevent inter-cluster access to network traffic and/or storage resources, even when the clusters involved include nodes executing in the same physical network and/or on the same hosts, addressing security issues in a multi-tenant environment. In some embodiments, resource isolation techniques, such as resource pooling and/or classification, enable performance isolation between clusters, potentially providing QoS guarantees. Further, provisioning a cluster of virtualized nodes enables fault tolerance features of the virtualization platform to be employed, enhancing the reliability of the distributed computing platform by addressing single points of failure.

Figure 1:
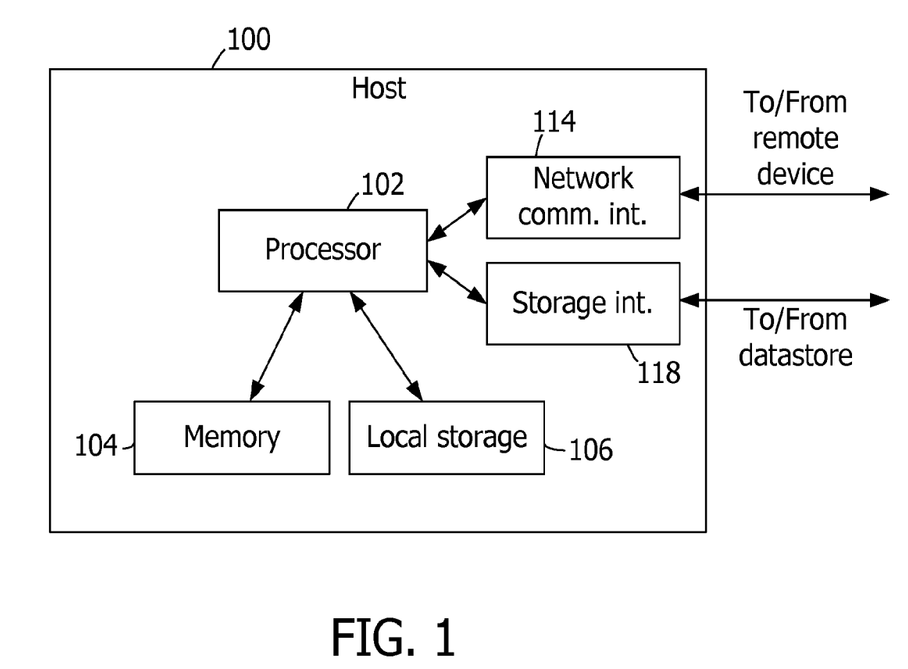
FIG. 1 is a block diagram of an exemplary host computing device.

FIG. 1 is a block diagram of a host computing device 100 (also referred to herein as a "host") supporting the running of one or more VMs that may serve as nodes of a cluster (sometimes referred to herein as a "VM node") for a distributed computing platform service, according to an embodiment. Host 100, for example, may be an x86 architecture platform that includes a processor 102 for executing instructions. In some embodiments, such executable instructions perform one or more operations described herein and are stored in a memory 104 and/or local storage 106. Memory 104 and local storage 106 are devices allowing information, such as executable instructions, cryptographic keys, virtual disks, configuration options (e.g., placement strategies and/or threshold values), and/or other data, to be stored and retrieved. Memory 104 may include, for example, one or more random access memory (RAM) modules. Local storage 106 may include, for example, one or more hard disks, flash memory modules, solid state disks, and/or optical disks.

Host 100 also includes a network communication interface 108, which enables host 100 to communicate with a remote device (e.g., a client device and/or any other host 100) via a communication medium, such as a wired or wireless packet network. For example, host 100 may transmit and/or receive data via a network communication interface 108. Host 100 may further include a storage interface 110 that enables host 100 to communicate with one or more network data storage systems that may, for example, store "virtual disks" that are accessed by node VMs. In one embodiment, storage interface 110 is a host bus adapter (HBA) that couples host 100 to a storage area network (SAN) (e.g., a Fibre Channel network) and/or a network interface card (NIC) that couples host 100 to a network-attached storage (NAS) system (e.g., storage interface 110 may be the same as network communication interface 108 in certain embodiments, etc.). Although host 100 is described above with reference to its operation as a computing device that supports one or more VM nodes, it should be recognized that similar computing devices may be configured (e.g., programmed) to operate as other systems described herein.

Figure 2:
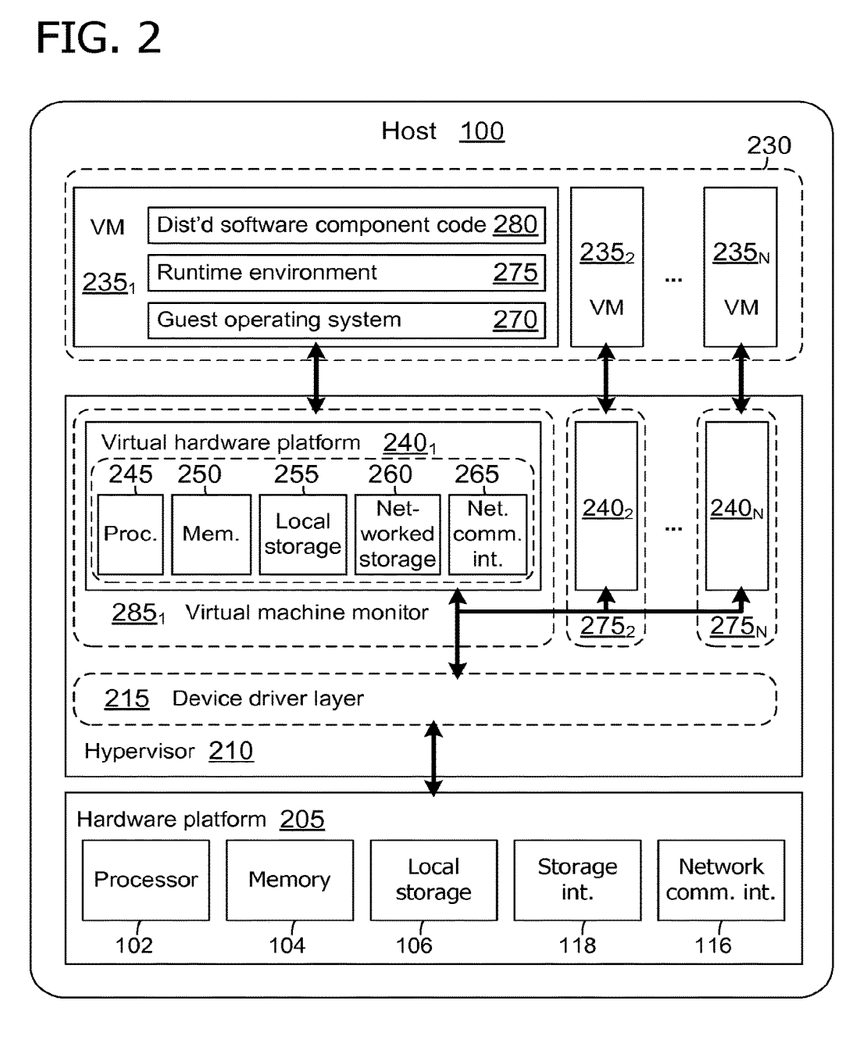
FIG. 2 is a block diagram of virtual machine (VM) nodes that are instantiated on a host computing device, such as the host computing device shown in FIG. 1.

FIG. 2 depicts a block diagram of VM nodes that are instantiated on a host 100. The hardware components of host 100 as described in FIG. 1 and referred to in FIG. 2 as hardware platform 205 supports a virtualization software layer, also referred to herein as a hypervisor 210. Hypervisor 210 supports a virtual machine execution space 230 within which multiple virtual machines (VMs $235_1$-$235_N$) may be concurrently instantiated and executed. As further described herein, one or more of such VMs $235_1$-$235_N$ may serve as VM nodes of a cluster generated and managed by a distributed computing platform service. Hypervisor 210 includes a device driver layer 215, and maps physical resources of hardware platform 205 to "virtual" resources of each of VMs $235_1$-$235_N$ such that each of VMs $235_1$-$235_N$ has its own virtual hardware platform (e.g., a corresponding one of virtual hardware platforms $240_1$-$240_N$). Each such virtual hardware platform 240 presents emulated hardware (such as a processor 245, memory 250, local storage 255, network storage 260, communication interface 265, etc.) that may, for example, function as an equivalent of a standard x86 hardware architecture for its corresponding VM. Virtual hardware platforms $240_1$-$240_N$ may be considered to be part of virtual machine monitors (VMM) $285_1$-$285_N$ which implement virtual system support to coordinate operations between hypervisor 210 and corresponding VMs $235_1$-$235_N$.

One or more VMs of host 100, such as VM $235_1$, may serve as a VM node of a cluster generated and managed by a distributed computing platform service as described herein. In the embodiment depicted in FIG. 2, VM node $235_1$ may include a guest operating system ("OS") 270 (e.g., Microsoft WINDOWS™, LINUX™, SOLARIS™, NETWARE™, FREEBSD™, etc.) which may support one or more applications including runtime environments 275, such as JAVA™ Virtual Machines ("JVMs"), that support the execution of distributed software component code 280 (e.g., JAVA code, etc.) for the distributed computing platform. For example, if the distributed computing platform is HADOOP, VM node $235_1$ may support a runtime environment 275 with a JVM that serves as a "master" node that executes distributed software component code 280 (e.g., JAVA code, etc.) implementing the "JobTracker" function, "TaskTracker" function and "NameNode" function of HADOOP that manages HDFS. Alternatively, VM node $235_1$ may serve as a "worker" node that executes code 280 implementing the "TaskTracker" and "DataNode" functions that support execution of additional user-specified code 280 (e.g., "Mapper" and "Reducer" code, etc.) that processes specific data files stored in HDFS accordingly. In particular, the NameNode function of a master VM node implements HDFS by communicating with DataNode components of worker VM nodes to store and access data files in a distributed fashion across the worker VMs. In one HADOOP embodiment, a "primary" virtual disk 350 accessed by VM node $235_1$ is represented by emulated local storage 255 and implemented as a file stored in local storage 106 of hardware platform 205. One example of a format for a virtual disk file is the ".vmdk" file format developed by VMware although it should be recognized that any virtual disk file format may be utilized consistent with the teachings herein. Such a primary virtual disk 350, which may be referred to as a boot disk, includes guest OS 270, runtime environment 275, and the distributed software component code 280 of the distributed computing platform. In such an embodiment, DataNode components of worker VM nodes may store (and access) HDFS files within the primary virtual disk 350 (i.e., emulated local storage 255) itself (e.g., where HDFS operates on top of the file system of guest OS 270 and for example, stores HDFS data files within a folder of the file system of guest OS 270).

Alternatively, worker VM nodes may be configured to have access to a second emulated local storage device 255 in virtual hardware platform 240 that corresponds to a different partition or portion of local storage 106 of hardware platform 205. In such an alternative HADOOP environment, an administrator of the distributed computing platform service may configure the DataNode component of worker VM nodes to store and access HDFS data files using the second emulated local storage device rather than the primary virtual disk. Such an approach allows cluster management application 335 to attach HDFS virtual disks 350 to, and detach HDFS virtual disks 350 from, VMs 235 dynamically. Accordingly, virtual disks 350 may be reassigned to VMs 235 by detaching from one VM, attaching to another VM, and updating metadata managed by the NameNode. Further, in some embodiments, the primary virtual disk (boot disk) includes guest OS 270, and a secondary virtual disk includes code for executing the distributed computing platform. Both primary and secondary virtual disks may be based on VM templates 345 in local storage 255 and/or VM templates 360 in networked storage 355, described in more detail below.

In yet another alternative HADOOP embodiment, the primary virtual disk utilized used by VM node (i.e., which stores guest OS 270, runtime environment 275, the distributed software component code 280 of the distributed computing platform, etc.) may be represented by networked storage 260 in virtual hardware platform 240 and may be stored as a file in shared storage (e.g., networked storage 355, described with reference to FIG. 3), such as a SAN networked to the host running the VM node. Such a virtual disk file is accessed by the VM node, for example, through another distributed file system used by hypervisor 210 to store virtual disks used by VMs 235 running on the host (e.g., the VMFS file system from VMware, Inc., etc.). In such a HADOOP environment, an administrator of the distributed computing platform service may configure the DataNode functionality of worker VM nodes to store and access HDFS data files using emulated local storage 255, which as previously discussed, is mapped or otherwise corresponds to portions of local storage 106 of hardware platform 205 rather than networked storage 355. In certain embodiments, the administrator of the distributed computing platform service may further configure any data processing output (e.g., results 365) produced by worker VM nodes to be stored in networked storage 355 rather than local storage 106, thereby reducing risk that reconfiguration or failure of the host will cause loss of data processing results. It should be recognized that the above HADOOP examples are merely a few examples of how a distributed computing platform may be structured across a cluster of VM nodes and that alternative structures within a VM node may be implemented consistent with the teachings herein. For example, rather than executing distributed software component code 280 in a runtime environment 275 such as a JVM on top of a guest OS 270, alternative embodiments may execute distributed software component code 280 directly on top of guest OS 270.

In some embodiments, the location of virtual disks 350 accessed by VMs 235 is determined based on the function of individual VMs 235. For example, a VM 235 executing DataNode functionality may be associated with a virtual disk 350 in emulated local storage 255, and a VM 235 executing TaskTracker functionality may be associated with a virtual disk 350 in networked storage 355. As another example, VMs 235 executing JobTracker and/or NameNode functionality may be associated with a virtual disk 350 in networked storage 355, such that another VM 235 may be attached to the virtual disk 350 and executed as a replacement in the event of a failure of the VM 235 originally executing the JobTracker and/or NameNode functionality.

It should be recognized that the various terms, layers, and categorizations used to describe the virtualization components in FIG. 2 may be referred to differently without departing from their functionality or the spirit or scope of the disclosure. For example, virtual hardware platforms $240_1$-$240_N$ may also be considered to be separate from VMMs $285_1$-$285_N$, and VMMs $285_1$-$285_N$ may be considered to be separate from hypervisor 210. Furthermore, in certain embodiments, hypervisor 210 may manage (e.g., monitor, initiate, and/or terminate) execution of VMs $235_1$-$235_N$ according to policies associated with hypervisor 210, such as a policy specifying that VMs $235_1$-$235_N$ are to be automatically restarted upon unexpected termination and/or upon initialization of hypervisor 210. Similarly, hypervisor 210 may manage execution of VMs $235_1$-$235_N$ based on requests received from a virtualization management application running on a computing device other than host 100. For example, hypervisor 210 may receive an instruction from a virtualization management application via network communication interface 108 to instantiate VM $235_1$ based on a "virtual disk" (as further described below) that is stored on a SAN accessible by storage interface 110 (e.g., HBA). One example of hypervisor 210 that may be used in an embodiment herein is the VMware ESXi™ hypervisor provided as part of the VMware vSphere™ solution commercially available from VMware, Inc. ("VMware"). Similarly, one example of a virtualization management application that may be used in an embodiment is the VMware vCenter™ Server commercially available from VMware.

Figure 3:
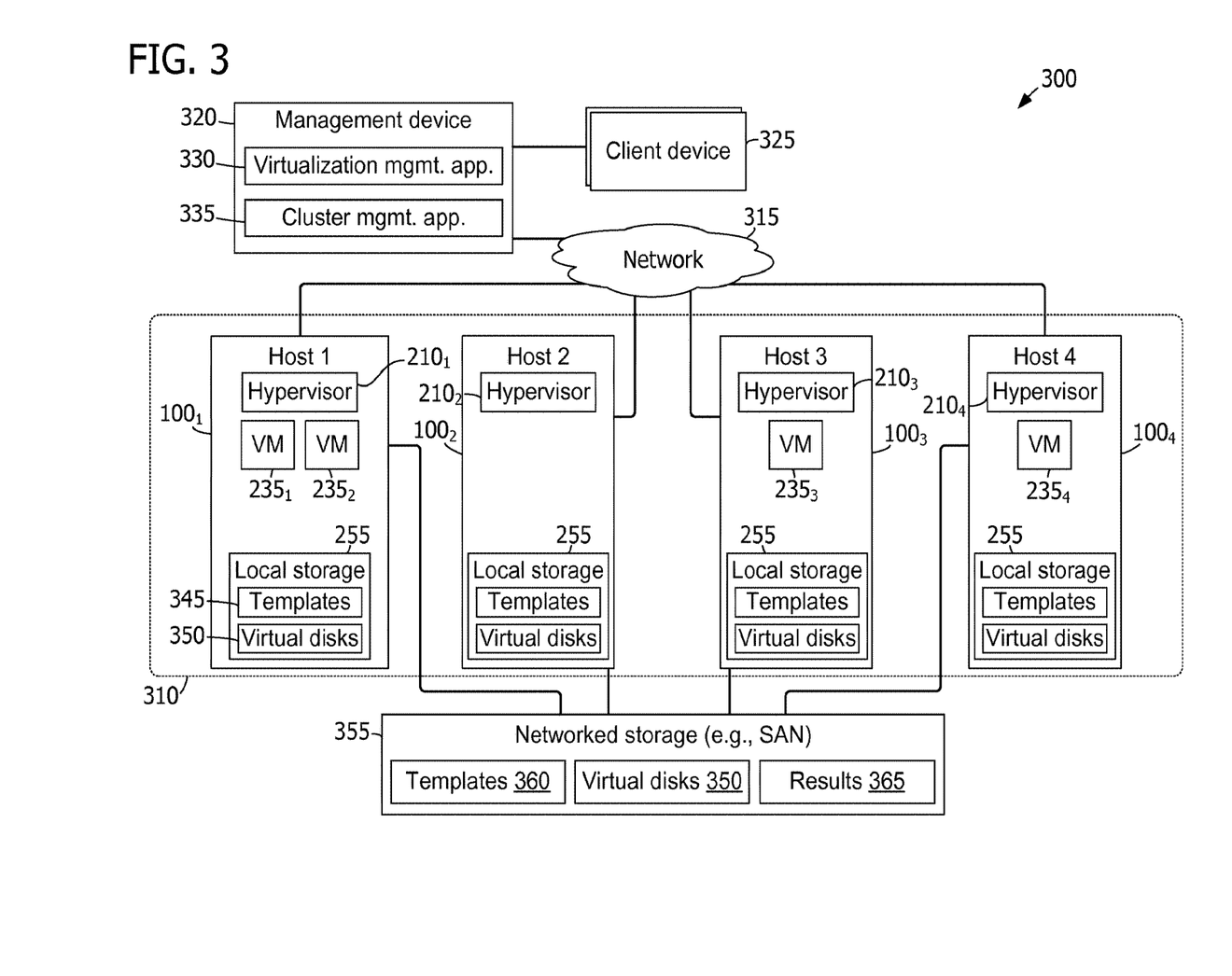
FIG. 3 is a block diagram of an exemplary cluster of VM nodes.

FIG. 3 is a block diagram of an exemplary cluster 300 of VM nodes 235 of a distributed computing platform running on hosts 100. Cluster 300 utilizes a host group 310 with a first host $100_1$, a second host $100_2$, a third host $100_3$, and a fourth host $100_4$. Each host 100 executes one or more VM nodes 235 of a distributed computing platform. For example, in the embodiment of FIG. 3, first host $100_1$ executes a first hypervisor $210_1$, a first VM node $235_1$, and a second VM node $235_2$. Second host $100_2$ executes a second hypervisor $210_2$. Third host $100_3$ executes a third hypervisor $210_3$ and a third VM node $235_3$. Fourth host $100_4$ executes a fourth hypervisor $210_4$ and a fourth VM node $235_4$. Although FIG. 3 depicts only four hosts in host group 310, it should be recognized that a host group in alternative embodiments may include any quantity of hosts 100 executing any quantity of VM nodes. As previously discussed in the context of FIG. 2, VM nodes 235 running in hosts 100 may execute one or more distributed software components of the distributed computing platform (e.g., for HADOOP embodiments, a NameNode component, JobTracker component, a Task-Tracker component, a DataNode component, a Mapper component, a Reducer component, etc.).

VM nodes 235 in hosts 100 communicate with each other via a network 315. For example, in a HADOOP embodiment, the NameNode functionality of a master VM node may communicate with the DataNode functionality via network 315 to store, delete, and/or copy a data file using HDFS. As depicted in the embodiment FIG. 3, cluster 300 also includes a management device 320 that is also networked with hosts 100 via network 315. Management device 320 executes a virtualization management application 330 (e.g., VMware vCenter Server, etc.) and a cluster management application 335. As previously discussed, virtualization management application 330 monitors and controls hypervisors 210 executed by hosts 100, for example, to instruct such hypervisors 210 to initiate and/or to terminate execution of VMs such as VM nodes 235. As further detailed herein, in embodiments, cluster management application 335 communicates with virtualization management application 330 in order to configure and manage (e.g., initiate, terminate, etc.) VM nodes 235 in hosts 100 for use by the distributed computing platform service (i.e., it should be recognized that, in certain embodiments, administrators of the IaaS or other data center environment in which hosts 100 reside may utilize virtualization management application 330 to manage VMs running on hosts 100 that are used for purposes other than the distributed computing platform service described herein). It should be recognized that in alternative embodiments, virtualization management application 330 and cluster management application 335 may be integrated into a single application or be implemented on different devices. Similarly, it should be recognized that management device 320 (or the functions therein) may be implemented as a one or more VMs running in a host in the IaaS or data center environment or may be a separate computing device.

As depicted in the embodiment of FIG. 3, users of the distributed computing platform service may utilize a user interface on a remote client device 325 to communicate with cluster management application 335 in management device 320. For example, client device 325 may communicate with management device 320 using a wide area network (WAN), the Internet, and/or any other network (not shown). In one embodiment, the user interface is a web page of a web application component of cluster management application 335 that is rendered in a web browser running on a user's laptop. The user interface may enable a user to provide a cluster size, data sets, data processing code (e.g., in a HADOOP environment, Mapper and Reducer related code) and other preferences and configuration information to cluster management application 335 in order to launch cluster 300 to perform a data processing job (i.e., in accordance with the data processing code) on the provided data sets. It should be recognized, in alternative embodiments, cluster management application 335 may further provide an application programming interface ("API") in addition supporting the user interface to enable users to programmatically launch or otherwise access clusters to process data sets. It should further be recognized that cluster management application 335 may provide an interface for an administrator. For example, in one embodiment, an administrator may communicate with cluster management application 335 through a client-side application, such as vSphere Client from VMware, or through a command line interface ("CLI").

As previously described in the context of FIG. 2, certain embodiments of a distributed computing platform service utilize VM nodes that access a primary virtual disk that is stored locally in local storage 106 of hardware platform 205. In such embodiments, portions of data sets (e.g., HDFS files) utilized by the distributed computing platform (e.g., HADOOP) may also be stored locally, within the primary virtual disk, or alternatively, within other partitions of local storage 106 that have been configured to be accessible by the relevant VM node. As further discussed below, in one embodiment, an administrator of the distributed computing platform service may prepare hosts 100 that may be candidates to support VM nodes for the distributed computing platform service by storing one or more "base" virtual disk templates 345 (e.g., .vmdk file, etc.) in the local storages 106 of such hosts 100. Such a virtual disk template 345 may include guest OS 270, runtime environment 275, and distributed software components of the distributed computing platform. As such, when cluster management application 335 (via virtualization management application 330) requests a certain host $100_1$ to instantiate a VM node $235_1$ for a cluster 300, such host $100_1$ can rapidly generate a primary virtual disk 350 for VM node $235_1$ as a "linked clone" (as further described herein) by using the locally stored virtual disk template 345 as a base template for the primary virtual disk 350.

As further depicted in the embodiment of FIG. 3, hosts 100 are further networked to a networked storage 355 such as a storage area network (SAN). In certain embodiments, an administrator may configure VM nodes 235 to consolidate and/or output any data processing or analysis results 365 in shared storage system 355. Certain embodiments may utilize networked storage 355 to store primary virtual disks for VM nodes 235 as opposed to storing such primary virtual disks locally as previously discussed. In one such embodiment, VM nodes 235 access their primary virtual disks (e.g., .vmdk files, etc.) stored in networked storage 355 through a distributed file system supported by hypervisors 210, such as the VMFS file system from VMware. In certain of such embodiments, as previously discussed, data sets processed by VM nodes 235 may still be stored and accessed using local storage 106 through a different distributed file system supported by the VM nodes 235, such as the HDFS file system from HADOOP.

Figure 4:
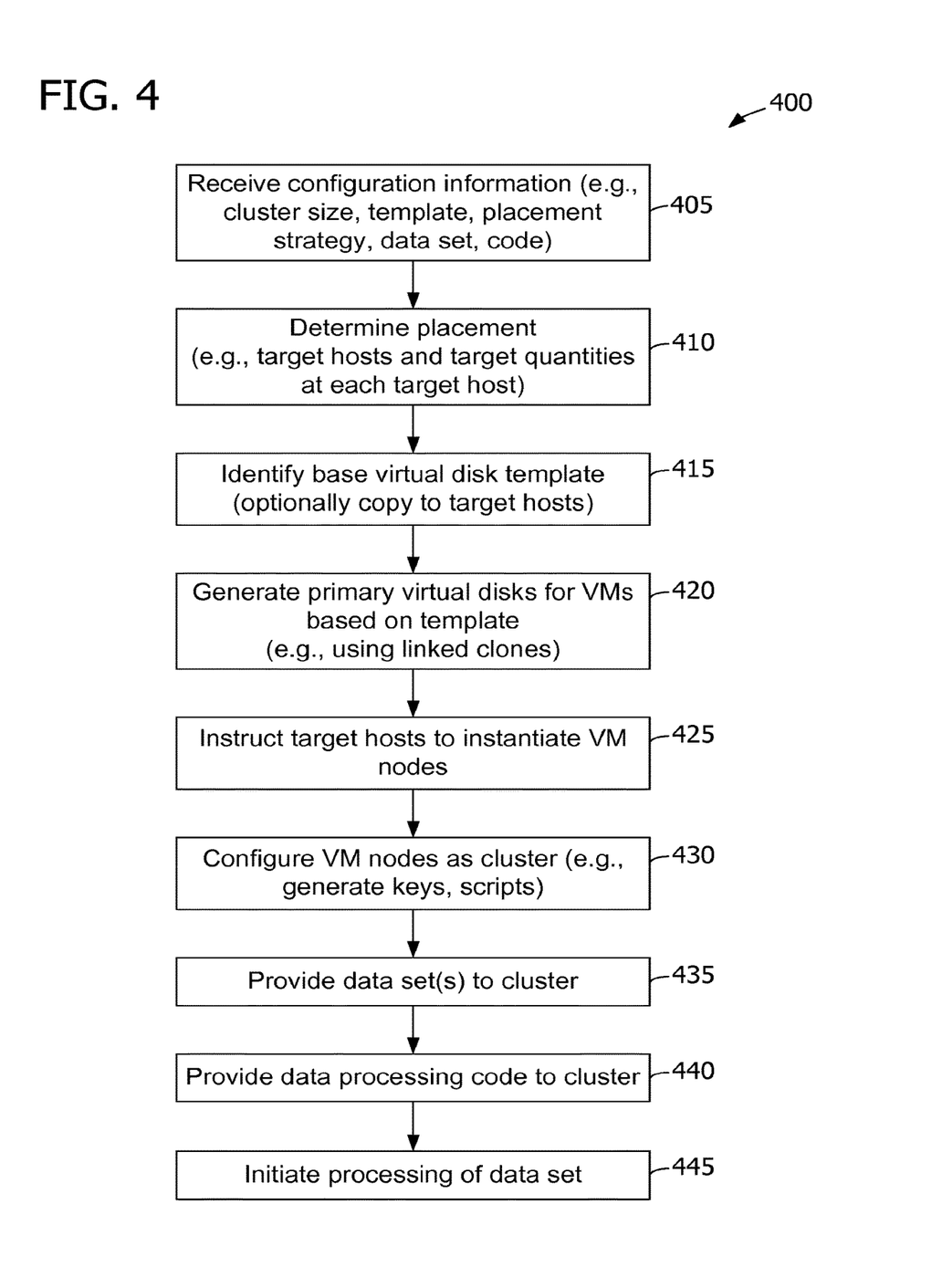
FIG. 4 is a flowchart of an exemplary method for provisioning a cluster of VM nodes for a distributed computing platform service.

FIG. 4 is a flowchart diagram of an exemplary method 400 for provisioning a cluster of VM nodes for a distributed computing platform service. In one embodiment, method 400 is performed by cluster management application 335. In step 405, cluster management application 335 receives configuration information from a user to provision a cluster within host group 310, such as cluster size, data sets, data jobs, etc. It should be recognized that the amount of configuration information that can be provided in step 405 by a user to cluster management application 335 in embodiments may vary, for example, depending upon a level of customization and flexibility that an administrator of the distributed computing platform service may desire to provide to users. For example, an embodiment that is designed to provide users a higher level of customization may further provide users a capability to select particular base virtual disk templates (e.g., different versions of HADOOP virtual disk templates having various combinations of different versions of guest OS, JVM and HADOOP software components, virtual disk templates to provision a cluster for different distributed computing platforms in addition to or other than HADOOP, etc.) to be used as primary virtual disks by the VM nodes in the cluster or may enable the user to choose a "placement strategy" for the cluster, such as to optimize operational efficiency, operational robustness, or a combination of operational efficiency and operational robustness. As previously discussed, receipt of such configuration information from the user may be achieved in a variety of ways, for example, through a user interface (e.g., web pages) or, programmatically, through an API.

Upon receipt of configuration information, in step 410, cluster management application 335 determines a placement of VM nodes (consistent with the specified cluster size in the received configuration information) by selecting one or more target hosts from host group 310 and determining the quantity of VM nodes to execute at each target host based on the specified cluster size (e.g., as provided by a user). For example, cluster management application 335 may select a quantity of hosts 100 equal to the cluster size as the target hosts, such that each target host will execute one VM node.

In certain embodiments, cluster management application 335 determines the placement of VM nodes within host group 310 based on a placement strategy, which may be predetermined (e.g., as a default setting) and/or received from a user (e.g., in step 405). For example, placing all VM nodes within hosts 100 that reside on a single rack in a data center may provide significant efficiency at the cost of robustness, as a hardware failure associated with this rack may disable the entire cluster. Conversely, placing all VM nodes at different hosts 100 or at hosts 100 in different racks in the data center may provide significant robustness at the cost of efficiency, as such a configuration may increase inter-host and/or inter-rack communication traffic. Accordingly, while in some scenarios, the administrator may be satisfied with one of the configurations described above, embodiments of cluster management application 335 may further enable the administrator to customize a placement strategy for VM nodes within host group 310 that provides a combination of efficiency and robustness.

In step 415, cluster management application 335 communicates with virtualization management application 330 to identify a base virtual disk template (as previously discussed) that may serve as a base template for a primary virtual disk for each VM node to be instantiated among hosts in host group 310 as determined in step 410. Cluster management application 335 may identify such a base virtual disk template based upon configuration information received in step 405 or may otherwise choose such a base virtual disk template based on other criteria (e.g., predetermined, etc.). In one embodiment, such an identified base virtual disk template 345 may be stored locally in each of the hosts' local storage 255, as previously discussed. For example, the administrator of the distributed computing platform service may have pre-provisioned each host in host group 310 with one or more such base virtual disk templates. In an alternative embodiment, the identified base virtual disk template may reside in networked storage 355 that is accessible by each of the hosts supporting a VM node as determined in step 410. In yet another alternative embodiment, cluster management application 335 may, as part of step 415, copy such a base virtual disk template from networked storage 355 (or local storage of one host containing such base virtual disk template) into the local storage 106 of hosts that have been selected to support a VM node in step 410. Furthermore, in certain embodiments, the identified base virtual disk template may be stored as "thinly provisioned" template in which available (e.g., allocated) but unused portions of the virtual disk are omitted from base virtual disk template. Storing a base virtual disk template in a thinly provisioned format may, for example, reduce the I/O usage and time spent by embodiments that copy the base virtual disk template from networked storage to each hosts' local storage as discussed above.

In step 420, cluster management application 335 further communicates with virtualization management application 330 to generate a primary virtual disk for each VM node that is based on the identified base virtual disk template. In one embodiment, virtualization management application 330 may instruct each host to generate a primary virtual disk for each VM node to be instantiated on such host as a "linked clone" of the base virtual disk template, which may be implemented as a "delta disk" (e.g., set of differences) between the linked clone and the base virtual disk template. It should be recognized that generating primary virtual disks as linked clones can significantly speed up the time needed for step 420 (as well as use significantly less storage) since linked clones are significantly smaller in size relative to the total size of the base virtual disk template. It should be recognized that alternative embodiments may utilizes full copies of the base virtual disk template for each VM node in a host rather than using linked clones.

In step 425, cluster management application 335 communicates with virtualization management application 330 to instruct each target host identified in step 410 to instantiate an appropriate number of VM nodes. In step 430, cluster management application 335 may then communicate with the VM nodes to configure them to properly interact as a cluster of the distributed computing platform. For example, in a HADOOP embodiment, cluster management application 335 may determine the hostnames and/or network addresses for each VM node and provide such mappings to each of the VM nodes to ensure that each VM node can communicate with other VM nodes in the cluster. In some embodiments, the configuration information received 405 by cluster management application 335 includes VM attributes, such as the number and/or speed of virtual processors 245, the amount of memory 250, the amount of local storage 255, and the number and/or type of network communication interfaces 265. In such embodiments, cluster management application 335 configures the VM nodes using the specified VM attributes. Similarly, cluster management application 335 may provide or otherwise update HADOOP configuration files (e.g., script files such as "HADOOP-env.sh" and/or configuration files such as "core-site.xml", "hdfs-site.xml", and "mapred-site.xml," etc.) in the VM nodes to properly identify master and worker VM nodes in the cluster (e.g., select VM nodes to serve as NameNodes, JobTrackers, etc.), HDFS paths, a quantity of data block replicas for HDFS files as further discussed below, etc. As further discussed below, embodiments of cluster management application 335 may further generate and provide a "rack awareness" script to each VM node to identify the physical rack of the host running the VM node.

Once the VM nodes are functioning as a cluster of the distributed computing platform, in step 435, cluster management application 335 may provide the data set to the cluster to be processed. Different portions of the received data set are stored in different local storages 255. Further, each portion of data may be stored redundantly in local storages 255 corresponding to hosts 100 at two or more locations (e.g., racks), as indicated by the generated rack awareness script. Accordingly, robustness of the data set may be increased, as the data set is protected against single points of failure associated with a single location in cluster 300. In addition, or alternatively, redundant copies, or replicas, of a portion of data may be stored in the same location, improving input/output efficiency. For example, storing replicas at the same location may decrease computing resource (e.g., network bandwidth) utilization associated with reading the data by reducing the amount of data transferred over network hardware (e.g., switches and/or routers) between locations. Replica placement (e.g., same location or different locations) may be based on the placement strategy received from the user in step 405. For example, given a placement strategy of operational robustness, replicas may be placed at different locations, whereas given a placement strategy of operational efficiency, replicas may be placed at the same location. Further, for a combination of operational robustness and operational efficiency, replicas may be placed both at the same location and at different locations. For example, for a given original portion (e.g., data block) of the data set, a first replica may be placed at the same location as that of the original portion, and a second replica may be placed at a different location from that of the original portion.

In some embodiments, as part of step 435, the data set received from the user in step 405 is persistently stored within a distributed file system, such as HDFS. In exemplary embodiments, cluster management application 335 enables the user to allocate the distributed file system among local storages 255 of hosts 100. Persistently storing the data set enables the user to maintain the life cycle of cluster 300 by, for example, ensuring that the data set received from the user is stored in the distributed file system until the user instructs cluster management application 335 to de-allocate, or "tear down," the distributed file system and/or cluster 300. Alternatively, the user may specify (e.g., as a configuration option received in step 405) that the life cycle of the distributed file system should be maintained automatically. In such a scenario, cluster management application 335 may allocate the distributed file system among local storages 255, store the data set within the distributed file system, and de-allocate the distributed file system from local storages 255 when processing of the data set is completed successfully. Regardless of whether the distributed file system is maintained by the user or by cluster management application 335, exemplary embodiments enable the data set to be received from the user and directly stored in the distributed file system, rather than first storing the data set outside the cluster and then copying the data set into the distributed file system. Accordingly, the delay and computing resource (e.g., network bandwidth and/or storage input/output) utilization associated with this step of copying the data set may be avoided. Such resource savings may be significant, especially when the data set is large in size (e.g., multiple terabytes or petabytes). Further, by protecting against single points of failure, exemplary embodiments enable overall processing of the data set to continue when a malfunction (e.g., hardware failure or power outage) occurs at a single location. For example, tasks operating against data at the affected location may be restarted in other locations at which redundant copies of the data are stored.

In step 440, cluster management application 335 provides data processing code (e.g., also received from the user in step 405, etc.) that instructs the distributed computing platform to analyze such data sets (e.g., Mapper and Reducer code in HADOOP). For example, in a HADOOP embodiment, cluster management application 335 may provide a data set (or reference to a previously stored data set) to the NameNode functionality of a master VM node, which, in turn, directs the DataNode functionality of worker VMs in the cluster to locally store portions of the data set, in replicated fashion, in accordance with the conventions of HDFS. Additionally, cluster management application 335 may submit Mapper and Reducer code to the JobTracker functionality of the master VM node, which subsequently determines which worker VM nodes in the cluster will perform execute the Mapper and Reducer code to collectively perform a distributed computing job on the data set to create results 365. In some embodiments, step 440 includes allocating worker VM nodes, and/or allocating Mapper and/or Reducer code, to hosts associated with local storage 255 that stores (e.g., within the distributed file system), the portion of the data set against which the allocated VM nodes, Mapper code, and/or Reducer code will operate.

In certain embodiments, cryptographic keys may be used to secure communications between master and worker VM nodes. For example, in step 430, cluster management application 335 may generate one or more public-private cryptographic key pairs using a utility such as "ssh-keygen" and provide such public keys to worker VM nodes to ensure the master VM node (or nodes) can communicate with worker VM nodes securely. Accordingly, the master VM node may be automatically authenticated by a worker VM node by encrypting such communication with the private key so that the communication may be decrypted using the public key. In step 445, cluster management application 335 is able to communicate with the master VM node and initiate processing of the data set.

Automatic Rack Awareness

Certain distributed file systems, such as HDFS, that may be used in embodiments to store data sets for processing by VM nodes are designed to reliably store large data sets as files on commodity hardware (e.g., local storage 255 of hosts 100) by providing fault detection and automatic data recovery. For example, HDFS stores a large data set file by dividing into many data blocks of the same size (except for the last block, which may have a smaller size) and then replicating such data blocks at a certain quantity among the VM nodes in the cluster to provide fault tolerance.

Strategically placing replicated data blocks with VM nodes residing on certain hosts in certain physical racks can provide a balance between writing cost (e.g., inter-host and/or inter-rack communication), data reliability and availability, and aggregating the reading bandwidth. In one embodiment, when, in the process of storing a data set file (e.g., received from step 405), HDFS generates a data block from a data set file, a first copy of the data node is placed in the local storage of the first VM node (e.g., NameNode, etc.), a second replica is placed at in the local storage of a second VM node running on a host on a different rack, and a third replica is placed on a different VM node running on a host on the same rack as the first VM node. In such an embodiment, if the number of replicas is greater than three, additional replicas are placed on the local storage random VM nodes in the cluster with few restrictions.

Accordingly, awareness of the rack in which each VM node and/or host resides may affect the performance (e.g., reliability and/or efficiency) of a distributed file system. In a non-cloud, non-virtualized environment, the user of a HADOOP cluster is generally also the administrator and can therefore provide a script to mapping each HADOOP node to a rack in order to provide rack information. It should be recognized that in a cloud environment as described herein, network topology, such as rack information, may not be directly available to the user since the user does not have access to the data center in which the HADOOP cluster operates. Accordingly, as previously discussed (e.g., step 430 of FIG. 4), embodiments may automatically generate a rack awareness script for use by VM nodes to identify the physical location (e.g., physical rack or facility) and/or network location (e.g., local area network, sub-network, router, or switch) at which the VM nodes operate.

In particular, embodiments may leverage neighbor device discovery protocols, such as IEEE 802.1AB Link Layer Discovery Protocol (LLDP) and Cisco Discovery Protocol (CDP), that are used by network devices of VM nodes to advertise information about themselves to other VM nodes on the network. Hypervisors 210 may include a network component (e.g., a virtual switch) supporting one or more of these protocols. Based on information provided by one or more hypervisors 210, cluster management application 335 can generate a rack awareness script that retrieves location (e.g., rack) information for the VM nodes by receiving physical switch information (e.g., a device identifier) from the virtual switches to which these VM nodes connect. Accordingly, the rack awareness script may include a mapping of VM node to host, and host to location, such that data or a task placed at a VM node may be traced to a corresponding location.

Figure 5:
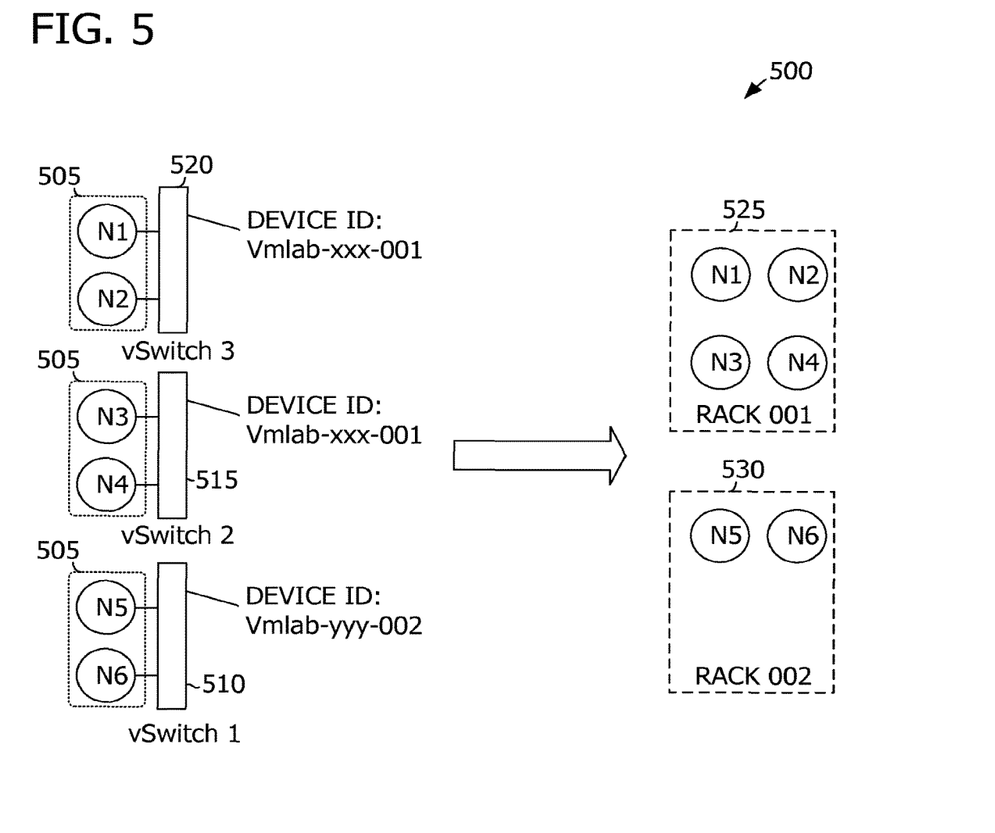
FIG. 5 is a block diagram of VM nodes on hosts that communicate with each other via a first virtual switch, a second virtual switch, and a third virtual switch.

FIG. 5 is a block diagram 500 of VM nodes 505 on hosts that communicate with each other via a first virtual switch 510, a second virtual switch 515, and a third virtual switch 520. Second virtual switch 515 and third virtual switch 520 are associated with a first device identifier ("Vmlab-xxx-001"). First virtual switch 510 is associated with a second device identifier ("Vmlab-yyy-002"). Accordingly, cluster management application 335 may associate VM nodes 505 corresponding to first virtual switch 510 with a first rack 525 and associate VM nodes 505 corresponding to second virtual switch 515 and third virtual switch 520 with a second rack 530. Cluster management application 335 may generate a rack awareness script representing these VM node-rack associations in step 430 when generating the cluster configuration.

By exposing rack information, HADOOP embodiments enable, for example, the NameNode functionality of a master VM node to place a "second data block" in a physical rack other than the physical rack in which the master VM node (or any other VM node with the responsibility of storing the data set file) resides. Further, to facilitate placing a "third data block" in the same rack as the master VM node, but on a different host, the location of a data block may be specified by a combination of a data center, a physical rack within the datacenter, a host within the rack, and a VM node within the host. Providing location information including the VM node enables the master VM node to distinguish between a VM node placed at the same host as the master VM node and a VM node placed at a different host but within the same rack as the master VM node, such that redundant data blocks may be distributed across physical equipment (e.g., hosts and racks), reducing the risk of data loss in the event of an equipment failure.

Security and Performance Isolation

Certain embodiments also utilize network virtualization techniques, such as cross-host fencing and virtual eXtensible local area network (VXLAN), to create isolated networks for different clusters provisioned by the distributed computing platform service that may, for example, have been requested by different customers through different remote client devices 325. Network isolation for different clusters dedicate to each such cluster a virtual network to carry traffic between VM nodes inside that cluster and between the cluster and outside reliable storage. The virtual network associated with one cluster is inaccessible to other clusters, even though the clusters may share the same physical network. Accordingly, such embodiments protect a customer's data from being read or tampered with by another customer.

It should be recognized that the utilization of VM nodes in embodiments provides a certain level of storage isolation with respect to storage (e.g., local storage 255, networked storage 260, etc.) corresponding to a VM node. For example, embodiments of hypervisor 210 ensure that the virtual disk files utilized by VM nodes (whether in local storage 255 or networked storage 260) are isolated from other VM nodes or other VMs that may be running on other the hosts or other hosts in the cluster or data center. As such, to the extent that certain embodiments of a distributed computing platform such as HADOOP require only certain nodes (e.g., NameNode, DataNode) of a cluster to have access certain data, use of VM nodes as described herein provides such isolation.

Additionally, in certain embodiments, an administrator may have the capability to configure cluster management application 335 and virtualization management application 330 to guarantee certain levels of quality of service (QoS) and/or service level agreements (SLA) for provisioned clusters. For example, the administrator may have the ability to utilize certain virtualized resource isolation techniques, such as resource pooling and/or classification (e.g., NetIOC and/or SIOC, both provided by VMware vSphere™), to reserve amounts or shares of computing resources (processor, network, storage, etc.) for provisioned clusters such that the performance of a cluster provisioned by the distributed computing platform service is unaffected by resource utilization of other cluster or other VMs running in the data center. Such embodiments allow computing resources to be allocated to customers based on the SLA and/or QoS level purchased by each customer. For example, one customer may be willing to pay for an assured level of resource allocation, whereas another customer may accept a "best effort" allocation of resources in exchange for a lower cost.

Fault Tolerance Protection

In certain embodiments, a supported distributed computing platform of the distributed computing platform service may have points of failures within its architecture with respect to certain functions. For example, in HADOOP, if the NameNode and JobTracker node of a cluster fail, then an administrator typically needs to manually intervene to restore operation of the cluster including starting the reprocessing of a large data set from the beginning.

In certain embodiments, cluster management application 335 and virtualization management application 330 provide the administrator of the distributed computing platform service an ability to apply fault tolerance (FT) techniques to VM nodes of a cluster that may be points of failure within the architecture of the distributed computing platform. For example, in a HADOOP environment, the administrator may provide a "backup" VM node on a different host that runs in a synchronized fashion with a master VM node of a provisioned cluster running NameNode and JobTracker functionalities. In one such embodiment, the master VM node is configured to transmit its instruction stream (e.g., non-deterministic events, etc.) to the backup VM node such that the backup VM node runs in lock-step with the master VM node. In the event of a failure of the master VM node, the backup VM node can assume the responsibilities of the master VM node without significant loss of time or data. executing as the name node and/or as the job tracker node when configuring 430 these nodes.

Exemplary Implementation

Figure 6:
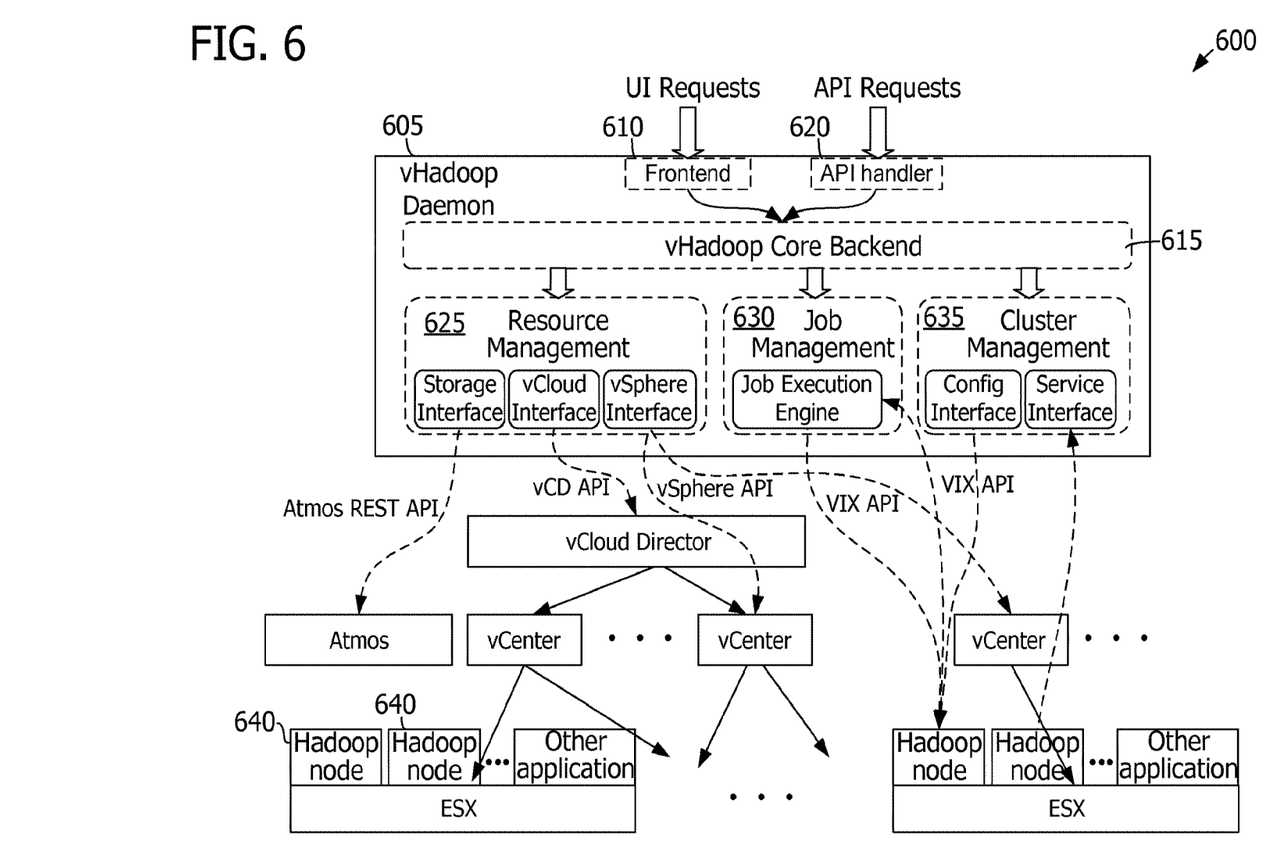
FIG. 6 is a block diagram illustrating an exemplary implementation of the system and methods described herein.

FIG. 6 is a block diagram 600 illustrating an exemplary implementation of the system and methods described herein. As described below, the distributed computing platform provided is HADOOP, referred to as "vHADOOP" in virtualized form. The implementation shown in FIG. 6 provides HADOOP as a service using a cloud infrastructure in which computing resources (e.g., processor time, memory, storage, and/or communication bandwidth) are made available to users in an aggregated form and shared among multiple users, such that the users are not required to manage individual computing resources. In the embodiment shown, cluster management application 335 (shown in FIG. 3) is implemented as a VM referred to as "vHADOOP Daemon" 605, executed with high availability (HA) enabled by VMware vSphere. While the following description refers to HADOOP and VMware vSphere in particular, the embodiments described herein enable automated provisioning and configuration of a distributed computing cluster using any distributed computing platform and any virtualization platform.

vHADOOP Daemon 605 includes a frontend module 610 to receive user interface requests from customers (e.g., cluster operators) at client devices, such as client devices 325 (shown in FIG. 3). Frontend module 610 forwards the requests to a vHADOOP core backend module 615. In addition to frontend module 610 and backend module 615, vHADOOP Daemon 605 includes an API handler 620 to support automated service (e.g. receipt of commands from a third party process rather than a human operative via the user interface). API handler 620 provides a representational state transfer (REST) application programming interface (API), such that remote devices may interact directly with vHADOOP core backend module 615, without manual input by a user.

vHADOOP Daemon 605 also includes a Resource Management module 625, a Job Management module 630, and a Cluster Management module 635. Resource Management module 625 includes logic for provisioning nodes 640 to create a vHADOOP cluster, and for provisioning storage (e.g., within a datastore) to store the results of the customer's computing job. Job Management module 630 includes logic for delivering customer's computing job to a master VM node, starting and stopping job execution, and tracking the status of the job during execution. Cluster Management module 635 includes logic for configuring the vHADOOP cluster and providing runtime light-weight services to HADOOP nodes 640.

Embodiments described herein provide largely automated provisioning and configuration of nodes in a distributed computing cluster. In addition, such embodiments enable automated scaling of computing resources to accommodate submitted computing jobs. For example, VM nodes are stateless before a new job is loaded and after a job is completed and are therefore easily created and recycled. If a computing job requiring a large amount of resources is submitted, new VM nodes can be automatically provisioned and added to a current cluster. A rebalance command may be executed to distribute some data to newly added nodes, such that a new and large-scale cluster is created. The procedure may be similar for recycling nodes when computing resource demand decreases, and the cluster size is scaled down. For example, N−1 nodes (where N is the number of data replicas in the cluster) may be recycled, and the rebalance command may be executed. This process may be performed iteratively, avoiding data loss.

The methods described may be performed by computing devices, such as hosts 100 and/or management device 320 in cluster system 300 (shown in FIG. 3). The computing devices communicate with each other through an exchange of messages and/or stored data. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some embodiments, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

Exemplary Operating Environment

The operations described herein may be performed by a computer or computing device. A computer or computing device may include one or more processors or processing units, system memory, and some form of tangible computer readable storage media. Exemplary computer readable storage media include flash memory drives, hard disk drives, solid state disks, digital versatile discs (DVDs), compact discs (CDs), floppy disks, and tape cassettes. Computer-readable storage media store information such as computer readable instructions, data structures, program modules, or other data. Computer-readable storage media typically embody computer-executable instructions, data structures, program modules, or other data. For example, one or more of the operations described herein may be encoded as computer-executable instructions and stored in one or more computer-readable storage media.

Although described in connection with an exemplary computing system environment, embodiments of the disclosure are operative with numerous other general purpose or special purpose computing system environments or configurations. Examples of well known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

Aspects of the disclosure transform a general-purpose computer into a special-purpose computing device when programmed to execute the instructions described herein.

The operations illustrated and described herein may be implemented as software instructions encoded on a computer-readable storage medium, in hardware programmed or designed to perform the operations, or both. For example, aspects of the disclosure may be implemented as a system on a chip.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

We claim:

1. A method comprising:
   receiving physical location information for a plurality of racks in which nodes executing application running environments are located, wherein each rack includes multiple host computing devices in a cluster of host computing devices;
   generating node and application running environment-rack associations using the physical location information for the cluster of host computing devices, wherein a node and an application running environment-rack association maps a node executing an application running environment to a rack;
   providing the node and application running environment-rack associations to the cluster of host computing devices; and
   providing a data set for storing in the cluster of host computing devices, wherein the data set is associated with a placement strategy, and wherein the cluster uses the placement strategy to store a data block in the data set for a first node executing a first application running environment and store a replica data block for a second node running a second application running environment at a location in the cluster of host computing devices based on the first node and the first application running environment being associated with a first rack from the node and application running environment-rack associations.

2. The method of claim 1, wherein the placement strategy specifies the replica data block is stored with respect to a second rack including the second application running environment, the second rack being different from the first rack including the first application running environment.

3. The method of claim 2, wherein:
   the data block is stored with respect to a first host computing device in the first rack, and
   the placement strategy specifies a second replica data block is stored with respect to a different host computing device in the first rack.

4. The method of claim 1, wherein the physical information identifies a combination of a rack, a host computing device within the rack, and an application running environment within the host computing device.

5. The method of claim 1, further comprising:
   providing a script configured to identify a location of an application running environment to a host computing device and a host computing device to a rack in the cluster; and
   receiving the physical location information based on running of the script at the cluster.

6. The method of claim 1, wherein a plurality of placement strategies are associated with the cluster, the method further comprising:
   selecting one of the plurality of placement strategies for storing the data set.

7. The method of claim 6, wherein the plurality of placement strategies comprises a first placement strategy of operational efficiency, a second placement strategy of operational robustness, and a third placement strategy of a combination of operational efficiency and operational robustness.

8. One or more non-transitory computer-readable storage media including computer-executable instructions that, when executed by a computer processor, cause the computer processor to perform:
   receiving physical location information for a plurality of racks in which nodes executing application running environments are located, wherein each rack includes multiple host computing devices in a cluster of host computing devices;
   generating node and application running environment-rack associations using the physical location information for the cluster of host computing devices, wherein a node and an application running environment-rack association maps a node executing an application running environment to a rack;
   providing the node and application running environment-rack associations to the cluster of host computing devices; and
   providing a data set for storing in the cluster of host computing devices, wherein the data set is associated with a placement strategy, and wherein the cluster uses the placement strategy to store a data block in the data set for a first node executing a first application running environment and store a replica data block for a second node running a second application running environment at a location in the cluster of host computing devices based on the first node and the first application running environment being associated with a first rack from the node and application running environment-rack associations.

9. The non-transitory computer-readable storage media of claim 8, wherein the placement strategy specifies the replica data block is stored with respect to a second rack including the second application running environment, the second rack being different from the first rack including the first application running environment.

10. The non-transitory computer-readable storage media of claim 9, wherein:
    the data block is stored with respect to a first host computing device in the first rack, and the placement strategy specifies a second replica data block is stored with respect to a different host computing device in the first rack.

11. The non-transitory computer-readable storage media of claim 8, wherein the physical information identifies a combination of a rack, a host computing device within the rack, and an application running environment within the host computing device.

12. The non-transitory computer-readable storage media of claim 8, further performing:
providing a script configured to identify a location of an application running environment to a host computing device and a host computing device to a rack in the cluster; and
receiving the physical location information based on running of the script at the cluster.

13. The non-transitory computer-readable storage media of claim 8, wherein a plurality of placement strategies are associated with the cluster, the computer processor further performing:
selecting one of the plurality of placement strategies for storing the data set.

14. The non-transitory computer-readable storage media of claim 13, wherein the plurality of placement strategies comprises a first placement strategy of operational efficiency, a second placement strategy of operational robustness, and a third placement strategy of a combination of operational efficiency and operational robustness.

15. An apparatus comprising:
one or more computer processors; and
one or more non-transitory computer-readable storage media including computer-executable instructions that, when executed by the one or more computer processors, cause the one or more computer processors to perform:
receiving physical location information for a plurality of racks in which nodes executing application running environments are located, wherein each rack includes multiple host computing devices in a cluster of host computing devices;
generating node and application running environment-rack associations using the physical location information for the cluster of host computing devices, wherein a node and an application running environment-rack association maps a node executing an application running environment to a rack;
providing the node and application running environment-rack associations to the cluster of host computing devices; and
providing a data set for storing in the cluster of host computing devices, wherein the data set is associated with a placement strategy, and wherein the cluster uses the placement strategy to store a data block in the data set for a first node executing a first application running environment and store a replica data block for a second node running a second application running environment at a location in the cluster of host computing devices based on the first node and the first application running environment being associated with a first rack from the node and application running environment-rack associations.

16. The apparatus of claim 15, wherein the placement strategy specifies the replica data block is stored with respect to a second rack including the second application running environment, the second rack being different from the first rack including the first application running environment.

17. The apparatus of claim 16, wherein:
the data block is stored with respect to a first host computing device in the first rack, and
the placement strategy specifies a second replica data block is stored with respect to a different host computing device in the first rack.

18. The apparatus of claim 15, wherein the physical information identifies a combination of a rack, a host computing device within the rack, and an application running environment within the host computing device.

19. The apparatus of claim 15, further performing:
providing a script configured to identify a location of an application running environment to a host computing device and a host computing device to a rack in the cluster; and
receiving the physical location information based on running of the script at the cluster.

20. The apparatus of claim 15, wherein a plurality of placement strategies are associated with the cluster, the computer processor further performing:
selecting one of the plurality of placement strategies for storing the data set.

21. The apparatus of claim 20, wherein the plurality of placement strategies comprises a first placement strategy of operational efficiency, a second placement strategy of operational robustness, and a third placement strategy of a combination of operational efficiency and operational robustness.

* * * * *